STABLE SQUARE-WAVE FREQUENCY GENERATOR USING TWO OPERATIONAL AMPLIFIERS WITH FEEDBACK
Filed July 24, 1969

INVENTOR.
JOHN O. WEDEL
BY
Thomas G. Keaugh
Ervin F. Johnston
ATTORNEYS

United States Patent Office 3,564,455

Patented Feb. 16, 1971

3,564,455

STABLE SQUARE-WAVE FREQUENCY GENERATOR USING TWO OPERATIONAL AMPLIFIERS WITH FEEDBACK

John O. Wedel, Baltimore, Md., assignor, by mesne assignments, to the United States of America as represented by the Secretary of the Navy

Filed July 24, 1969, Ser. No. 844,543
Int. Cl. H03b *5/20*
U.S. Cl. 331—135 4 Claims

ABSTRACT OF THE DISCLOSURE

A square-wave frequency generator, formed of a pair of operational amplifiers driven at saturation and having two interconnected resistive feedback loops, has a resistor-capacitor integrating network connected across one of the amplifiers to create a stable square-wave output. Stability is ensured by employing the passive resistive elements, along with the capacitor, to establish the time period of a generated wave and, by driving the amplifiers at saturation, a self-sustaining output signal is provided whose period is relatively independent of possible minor variations in the internal supply potentials and ambient temperatures.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Using a square-wave signal in electronic systems is a frequent design requirement. Usually, an astable multivibrator, or a triggered flip-flop circuit, is applied, inherently requiring thresholds in the order of 0.2 to 1.0 volt. Since the output frequency of these frequency generators is a function of the applied potentials, a typical supply potential variation of one to two percent results in a supply voltage change of several tenths of a volt and a resultant output frequency change. Similarly, the output frequency is affected by changing ambient temperature for breakdown potentials vary in accordance with surrounding temperatures, and, hence, voltage thresholds vary. If elaborate temperature compensation networks are not present, voltage thresholds can vary in the order of five to ten percent in a changing ambient temperature. A typical representative multivibrator is disclosed in "Transistor Circuit Design," Texas Instruments, McGraw-Hill (1963), pp. 378–379 showing that $V_{BB}$ is employed routinely to vary the output frequency of a multivibrator. Because of supply variations and temperatures, contemporary square-wave frequency generators must include expensive, elaborate temperature compensation networks and precisely regulated power supplies to ensure a stable square-wave output signal.

SUMMARY OF THE INVENTION

The present invention is directed to providing a stable, square-wave frequency generator formed of a first operational amplifier and a second operational amplifier interconnected by a pair of resistive, regenerative feedback loops, and having an integrating circuit connected across one of the amplifiers. Each amplifier has a very large gain and is driven at saturation by input signals in excess of each amplifier's threshold level. The overall circuit depends on the resistive, regenerative feedback loops and the capacitive integrating circuit to regulate the frequency of a square-wave output signal, and thus, does not produce output frequency changes as a result of supply potential variations and ambient temperature fluctuations.

It is the prime object of the instant invention to provide a stable, square-wave frequency generator.

It is an object of the invention to provide a circuit providing a square-wave output signal independent of minor deviations in the supply potential and of surrounding temperature fluctuations.

Yet another object is to provide a circuit formed with operational amplifiers, the output frequency of which being dependent on stable circuit components.

These and other objects of the instant invention will become readily apparent from the ensuing description when taken with the accompanying drawings.

DESCRIPTION OF THE PREFERRED EMBODIMENT

Figure 1:
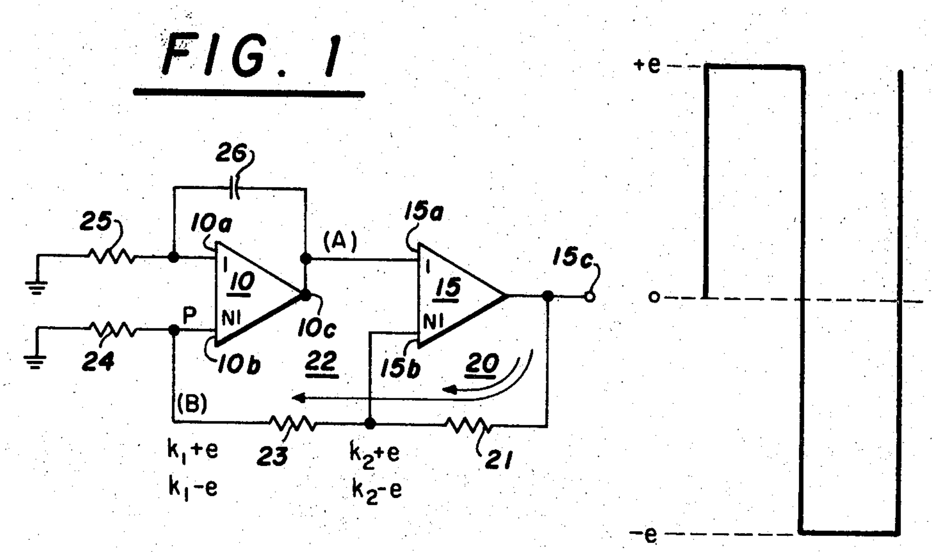
FIG. 1 shows a circuit diagram of the instant invention.

Referring now to the drawings, FIG. 1 shows a first operational amplifier 10 having inverting input lead 10*a* and a non-inverting input lead 10*b*. In the present invention, $\mu$A709 amplifiers are used and the input leads are said to be inverting and non-inverting in accordance with their internal function, i.e., providing an output signal at output lead terminal 10*c* having an inverted polarity from the polarity of an input signal applied at lead 10*a*, or non-inverted providing an output signal having the same polarity as the applied input signal. Following the first amplifier, a second operational amplifier 15 is similarly equipped with an inverting input terminal 15*a*, a non-inverting input terminal 15*b*, an output terminal 15*c*, and functions in a manner similar to amplifier 10. A first regenerative feedback loop 20 contains a series resistor 21, and a second regenerative feedback loop 22 includes resistor 21 as well as a second resistor 23. A third resistor 24 and a fourth resistor 25 are provided to produce threshold voltages across the input terminals of the first operational amplifier in a manner to be described below.

Internal supply potentials within the second operational amplifier are provided with the magnitude of $+e$ and $-e$ to saturate at a potential substantially equalling the supply potentials to provide output waveforms shown in FI1. 1 appearing at output terminal 15*c*. Across terminals 10*a* and 10*c*, an integrating capacitor 26 electronically cooperates with the resistor 25 to produe output signals shown by the waveforms in FIG. 2 appearing at point A in FIG. 1.

In the instant case, a circuit designer need only select operational amplifiers from among the commercially-available models having predetermined, symmetrically disposed threshold values with respect to zero at the inverting and non-inverting inputs, to enable responsive circuit operation when balanced internal supply potentials having the magnitudes $+e$ and $-e$ are chosen. Threshold signals for both amplifier 15 and 10 are derived from a first regenerative feedback loop 20 and a second regenerative feedback loop 22, respectively, in the form of self-sustaining, positive feedback currents. The magnitudes of amplifier its self-sustaining predetermined threshold potential to input lead 15*b* or input lead 10*b*.

The threshold potentials at amplifier 10 and amplifier 15 can be expressed as a function of the internal supply voltages $+e$ and $-e$ by the relationships:

(1) $$k_2+e \text{ or } k_2-e$$

where, (2) $$k_2=\frac{R_{23}+R_{24}}{R_{21}+R_{23}+R_{24}}$$

and $R_{21}$, $R_{23}$, and $R_{24}$ are ohmic values for resistors 21, 23, and 24. Similarly, a self-sustaining threshold potential for amplifier 10 is set forth as a function of the internal supply potentials $+e$ and $-e$ in the relationship:

(3) $$k_1+e \text{ or } k_1-e$$

where, (4) $$k_1=\frac{R_{24}}{R_{21}+R_{23}+R_{24}}$$

These threshold potentials, $k_2+e$, $k_2-e$ and $k_1+e$, $k_1-e$, appear at the respective non-inverting inputs 15*b* and 10*b*, noting FIG. 1, during alternate excursions of the output signal $+e$ and $-e$ appearing at output terminal 15*c*.

If the output of the operational amplifier 15 saturates at the supply voltages of $+e$ and $-e$, the positive feedback around amplifier 15 presents a signal of the magnitude equaling $k_2+e$ at terminal 15*b* to ensure a continuous saturated output. Similarly, a fraction of the supply potential equal to $k_1+e$ appears at the non-inverting input lead 10*b* driving amplifier 10 to produce a positive going signal at output lead terminal 10*c*· Since the signal "builds" on integrating capacitor 26 at a predetermined slewing rate, which is defined as being the rate at which an output can be driven from limit to limit over the dynamic range, the signal appearing at point A in the circuit integrates up until a threshold equal to $k_2+e$ is impressed on inverting input terminal 15*a*. At this point, the output on amplifier 15 reverses quickly and saturates at the opposite supply, $-e$, to set a new threshold of $k_2-e$ at amplifier 15 and a threshold of $k_1-e$ on input lead 10*b*. The integrating capacitor 26 slews negatively until the $k_2-e$ threshold is reached at inverting input terminal 15*a*. Amplifier 15 inverts the input signal to produce an output of $+e$ and the process starts over.

Figure 2:
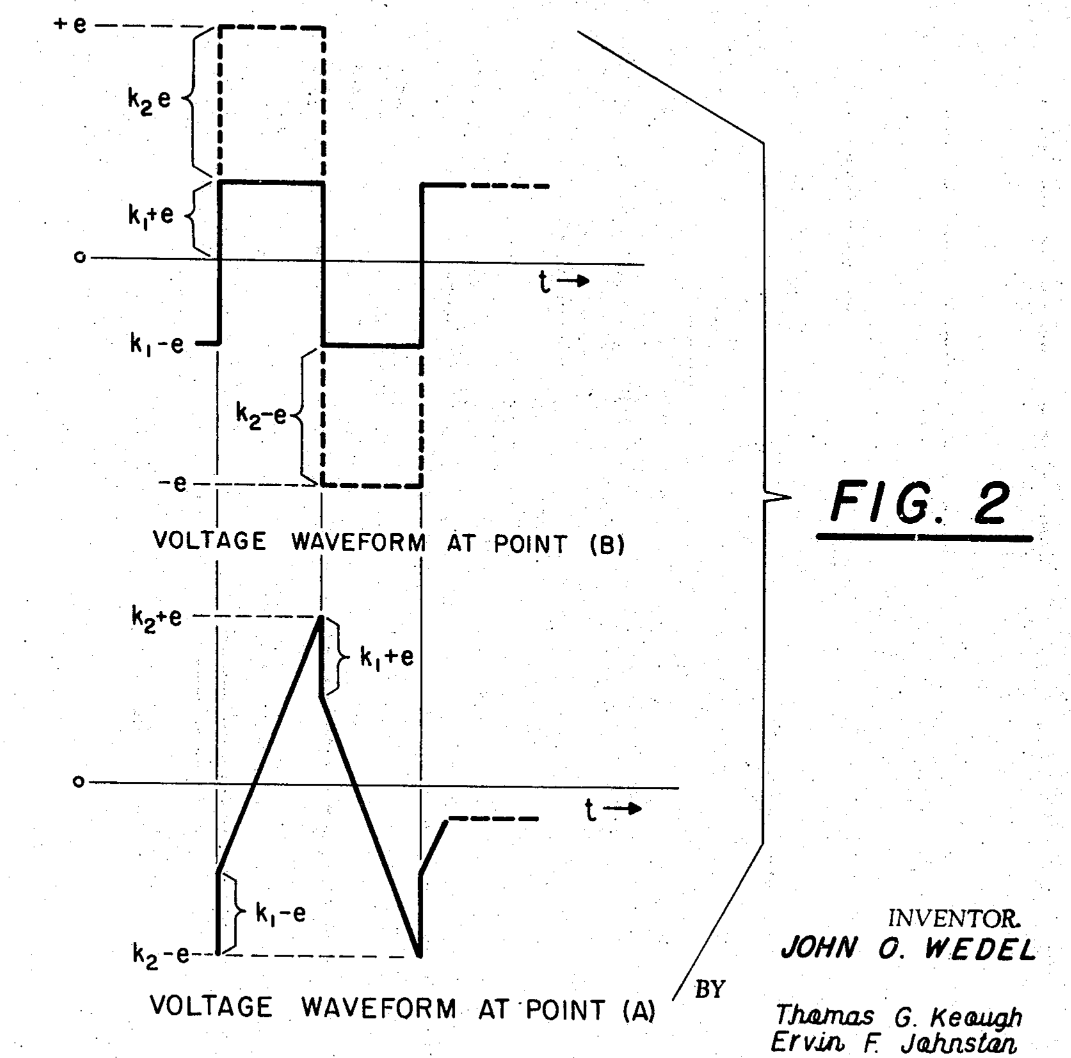
FIG. 2 depicts representative waveforms on an identical time base.

Representative waveforms on a common time basis showing a comparison between the instantaneous values at point A and point B are shown in FIG. 2. A jump represented in the voltage waveform at point A represents the potential drop acros the first operational amplifier 10 as its threshold of $k_1+e$ or $k_1-e$ is attained. The slanted line connecting the "jump," depicts the slewing rate of the integrating capacitor. Because the voltage change on the non-inverting input of amplifier 10 is followed by an inverting input, and, since the voltage across the capacitor cannot change instantly, the output of amplifier 10 must follow the input to the capacitor.

When $+e$ equals $-e$, an expression defining the period of the stable square-wave generator is shown by the equation:

(5) $$T=\frac{4R_{25}C_{26}(k_2-k_1)}{k_1}$$

Therefore, it is apparent that the period is a function of the pasive components $R_{21}$, $R_{23}$, $R_{24}$, $R_{25}$, and $C_{26}$ which are relatively unaffected by changes in ambient temperature and supply potentials.

However, if a representative power supply of $+e$ and $-e$ equal $\pm 10$ volts, and a one percent supply potential variation occurs, and $+e$ qual 9.9 volts and $-e$ equals $-10.1$ volts. When $e$ does not equal $-e$, the expression of Equation 5 becomes, (6) $$T=\frac{R_{25}C_{26}(k_1-k_2)((-e)-(+e))^2}{k_1(-e)(+e)}$$

and substituting values for $-e$ and $+e$ Equation 6 is (7) $$T=\frac{4.0039R_{25}C_{26}(k_1-k_2)}{k_1}$$

to effect an overall period change of .097%. If a square-wave period of stability of 0.5% (in order of magntiude better than conventional generators) is required, the largest contributor to the period change are the passive components (stable capacitors and resistors are available at plus and minum 25 p.p.m. per C. °). This sort of change caused by the passive components is essentially neglected in most circuit applications.

Obviously, many modifications and variations of the present invention are possible in the light of the above teachings and it is therefore understood that within the scope of the disclosed inventive concept, the invention may be practiced otherwise than as specifically described.

What is claimed is:

1. A frequency generating apparatus for providing a stable square-wave signal comprising:

a first amplifying means having a first input lead, a second input lead, and a trigger output lead;

a second amplifying means having a first input terminal, a second input terminal, and an output terminal, said first input terminal coupled to receive a trigger signal from said trigger output lead;

a first feedback loop coupling said output terminal to said second input terminal for impressing a fractional portion of said squave-wave signal appearing at said output terminal thereat;

a second feedback loop connected to pass a proportional portion of said square-wave signal to said second input lead; and integrating means joining said trigger output lead to said first input lead formed of elements ensuring a slewed said trigger signal having a duration equal to one half the period of said square-wave signal, said slewed said trigger signal and said proportional portion alternately actuating said first amplifying means to create an alternating said trigger signal electrically cooperating with said fractional portion to alternately actuate said second amplifying means to provide said square-wave signal.

2. An apparatus according to claim 1 in which said integrating means is a serially connected capacitor and a resistor coupled between said first input lead and ground.

3. An apparatus according to claim 2 in which said first amplifying means is an operational amplifier having an inverting input being said first input lead and a non-inverting input being said second input lead and said second amplifying means is an operational amplifier having an inverting input being said first input terminal and a non-inverting input being said second input terminal.

4. An apparatus according to claim 3 in which said first feedback loop is formed of a first resistor and said second feedback loop is formed of said first resistor, a second resistor, and a third resistor, said fractional portion has a fractional value equal to the sum of said second and third resistors divided by the sum of said first, second, and third resistor, and said proportional portion has a proportional value equal to the value of said third resistor divided by the sum of said first, second, and third resistor.

References Cited

UNITED STATES PATENTS 3,491,311 1/1970 Meyer et al. ______ 331—135X

OTHER REFERENCES

Cohen, "Ultrastable Triangle and Square Wave Generator," The Review of Scientific Instruments, vol. 37, March 1966, pp. 260–261.

ROY LAKE, Primary Examiner

S. H. GRIMM, Assistant Examiner

U.S. Cl. X.R.

331—143